United States Patent [19]
Laker

[11] 3,877,866
[45] Apr. 15, 1975

[54] METHOD AND APPARATUS FOR THE MANUFACTURE OF BRICKS

[75] Inventor: Patrick Allen Laker, Rudgwick, England

[73] Assignee: Rudgwick Brickworks Company Limited, Rudgwick, Sussex, England

[22] Filed: Nov. 12, 1973

[21] Appl. No.: 415,180

[30] Foreign Application Priority Data
Nov. 20, 1972  United Kingdom............... 53596/72
Jan. 23, 1973  United Kingdom................ 3494/73

[52] U.S. Cl..................................... 432/6; 432/258
[51] Int. Cl............................................ F27b 17/00
[58] Field of Search ....................... 432/1, 5, 6, 258

[56] References Cited
UNITED STATES PATENTS
1,607,525  11/1926  Gillam .................................... 432/6

*Primary Examiner*—John J. Camby
*Attorney, Agent, or Firm*—Finnegan, Henderson, Farabow and Garrett

[57] ABSTRACT

Bricks are fired in a clamp using gas burners burning, for example, butane and thereby avoiding the expense and wastage which results from firing with a conventional coke bed. The green bricks are built up from a concrete floor, with fire tunnels and associated flues formed in the clamp structure. The lower courses of green bricks are open-set but the remainder of the clamp is close-set. The sides and top of the clamp are covered by a casing structure.

4 Claims, 5 Drawing Figures

METHOD AND APPARATUS FOR THE MANUFACTURE OF BRICKS

This invention relates to the manufacture of bricks.

A method of manufacturing bricks is to mix clay, possibly with other materials added, with combustible material in the form of particles of breeze or grits and to mould such mix into bricks which are dried so that they retain their brick shape while being handled, such dried bricks being known and referred to hereinafter in this specification as "green bricks." The green bricks are then stacked in, for example, a clamp or a kiln and an appropriate firing process is applied which burns the breeze or grits particles in the green bricks resulting in finished or fired bricks suitable for use, for example, in house building.

The best finished bricks (known as 'facing' or 'stock' bricks) are produced in a clamp and in accordance with the conventional procedure practised hitherto green bricks are stacked over a coke-bed, the coke-bed is ignited and the fire is allowed to spread throughout the coke-bed and the clamp of green bricks and, eventually, the major part of the clamp is burned through. This procedure is not amenable to control and, furthermore, complete combustion of all the breeze or grits particles in all the green bricks is hardly ever possible. Another great disadvantage is that such a procedure can take on average about 4 weeks.

The present invention has the primary object of reducing the time taken to produce finished bricks when fired in a clamp.

A further object is to enable a greater proportion of green bricks in a clamp to be fired to constitute finished bricks.

Another object is to avoid the need to provide a coke-bed at the base of the clamp.

According to one feature of the present invention there is provided a method of firing green bricks comprising the steps of:

a. providing a non-combustible supporting surface;

b. constructing on said surface a stack of green bricks arranged in layers one upon the other and, in so doing, forming a plurality of tunnels extending from one side of the stack to the other and a flue leading from each tunnel to a respective aperture in the top of the stack;

c. setting the bricks in at least the bottom two layers of said stack to form a plurality of ducts extending between adjacent tunnels and close-setting the bricks in the remaining layers of said stack;

d. encasing said stack with a casing structure extending over the sides and top of the stack with the exception of one or both ends of said tunnels and said apertures;

e. introducing successively at each tunnel an ignited source of a combustible gas or vapour;

f. after the green bricks constututing a tunnel have ignited, removing said source of combustible gas or vapour and closing the tunnel end and, if necessary, at least partially closing the aperture of the associated flue;

g. allowing the process of combustion of the green bricks to spread through the walls separating adjacent tunnels and also upwardly to the top of said stack.

According to another feature of the invention there is provided a brick clamp consisting of a stack of green bricks arranged in layers with the bottom layer in direct contact with a non-combustible (e.g., concrete) supporting surface, the stack being encased at the sides and the top by a casing structure, a plurality of tunnels extending through the clamp from one side to the other each tunnel having a flue leading to a respective aperture in the top of the clamp, said tunnels and flues being formed by and during the setting of the bricks, adjacent tunnels being separated by a wall of green bricks in which the bricks in at least the two bottom layers are set so as to form a plurality of ducts extending between the two tunnels, the bricks in the remaining layers in the walls and in the layers above said walls being close set; whereby the geeen bricks can be fired by introducing at the end of each said tunnel an ignited source of a combustible gas or vapour.

Preferably, the bricks in all the layers of bricks in a wall separating two adjacent tunnels are set so as to form a plurality of ducts extending between said tunnels.

In a modification of the invention, selected walls separating adjacent tunnels are constructed so that said ducts are blocked within the wall; whereby flow of ignited gas or vapour can be substantially contained between said selected walls.

In this specification the following expressions have the following meanings:

"Close-set" bricks means bricks arranged side-by-side without any spacing between adjacent bricks.

"Open-set" bricks means bricks arranged side-by-side with intentional spacing between adjacent bricks.

"Casing bricks" means green bricks (as hereinbefore defined) which have been only partially fired.

Other features of the invention will appear hereinafter.

Embodiments of the invention will now be described, by way of example only, with reference to the accompanying drawings in which.

Figure 1:
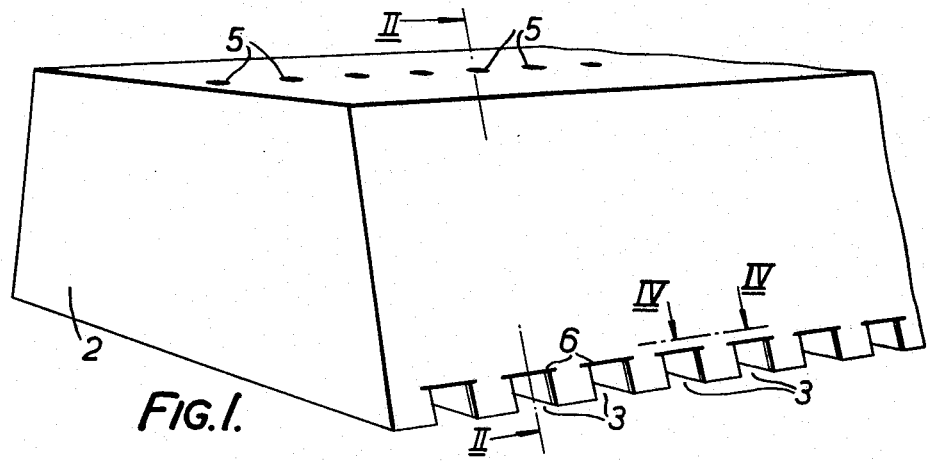
FIG. 1 is a perspective view of part of a brick clamp, as seen from one end, in accordance with the invention.
Figure 2:
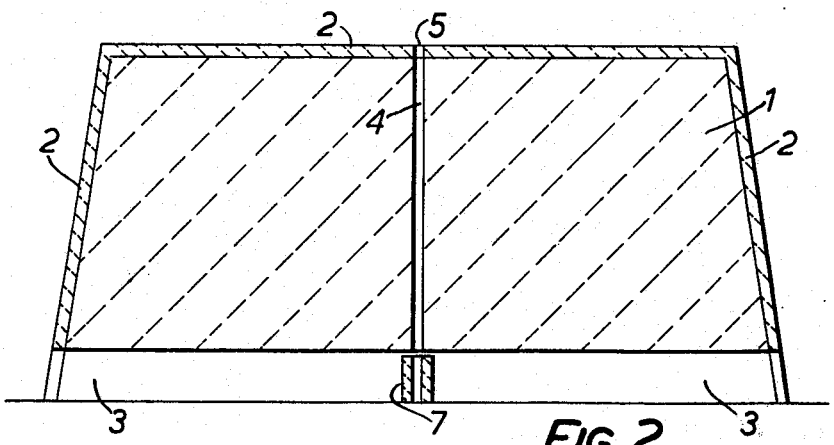
FIG. 2 is a sectional view taken on the line II—II of FIG. 1.

Referring to the drawings, a clamp is constructed of green bricks 1 stacked in layers one upon the other to form a structure of trapezoidal cross-section having a dimension across the base of, for example, 30 to 40 feet and a height of 10 to 12 feet. There is no limit to the length of the clamp. The stack of green bricks is encased at the sides and the top by a casing 2 of casing bricks which are all close-set. The clamp structure is built up directly from an incombustible supporting surface, which may be a re-inforced concrete raft, e.g., 18 inches thick, including a raised rim which slopes downwardly from the edges of the raft for supporting the casing bricks. The bricks in each of at least the first two layers of green bricks at the bottom of the clamp are open-set and may be spaced from each other about a ½ to ¾ of an inch, as by finger spacing. All the green bricks in the higher layers are close-set. If desired, the lower edge of the casing 2 where it abuts the ground surface may be sealed all around the clamp with mortar.

Along the length of the clamp of plurality of tunnels 3 is constructed. Each tunnel extends from one side of the clamp to the other and, at the middle of the clamp, each leads to a respective flue 4 rising to an outlet aperture 5 in the top of the clamp. The flues 4 are formed by open-setting bricks at the desired location during construction of the clamp. The tunnels 3 are located from the end of the clamp and from each other by a distance such that complete firing of the majority of intervening green bricks takes place, for example a distance equivalent to two or three brick lengths between tunnels. Each tunnel 3 is, for example, 12 to 24 inches high and from 9 to 18 inches wide, preferably 10 to 14 inches wide.

The opening to each tunnel 3 is shown as formed, at the top, by a steel plate 6 which extends into the tunnel sufficiently to support the casing bricks. However, the casing bricks may be set so as to dispense with the plate 6. Thereafter between the two openings of the tunnel the roof is vaulted as by insetting the green bricks throughout a height of say two or three bricks to provide the necessary support for the clamp structure above.

Preferably, and as shown, a baffle structure 7 is located in each tunnel below the flue 4. The structure 7 is formed of open-set green bricks and assists gases of combustion to flow upwardly into the flue. Possibly it may be found that such a baffle structure is not necessary.

Figure 3:
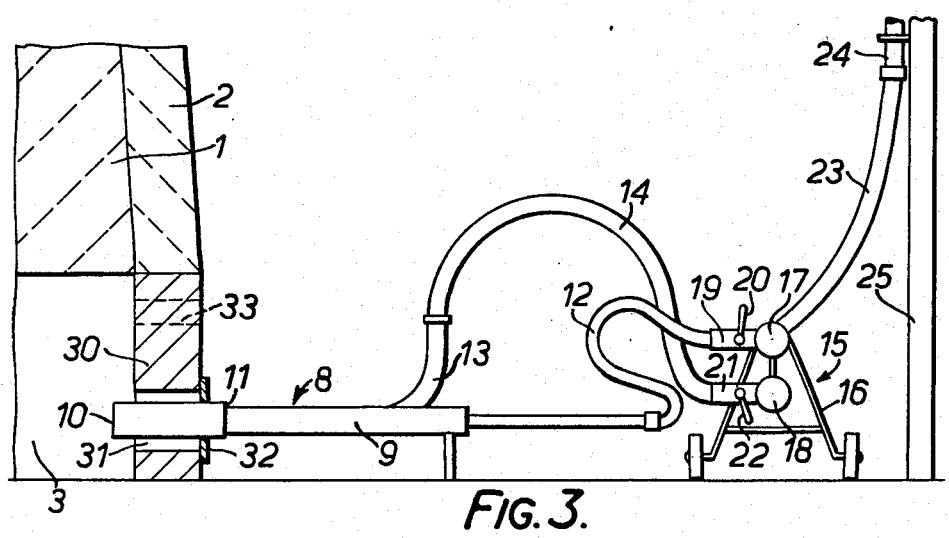
FIG. 3 shows a part of FIG. 2, to an enlarged scale, and a gas burner in position alongside the clamp.

It must be emphasised that the clamp structure does not include any form of coke-bed. Firing of the clamp is achieved by introducing at each tunnel an ignited source of a combustible gas or vapour, e.g., a gas burner, located externally of the clamp. One such gas burner 8 is shown in FIG. 3. Preferably the burners consume liquid petroleum gas (e.g., butane or propane) but any other liquified fuel or town gas or natural gas may be used. The tunnel opening is sealed with bricks and mortar 30 except for an aperture 31 through which the burner projects, this aperture being closed by a steel plate 32 supported on the burner. Preferably, and as indicated by broken lines, one or more bricks 33 are left loose so that they can be removed to inspect the burning of the bricks forming the tunnel and also the state of the gas flame.

Figure 4:
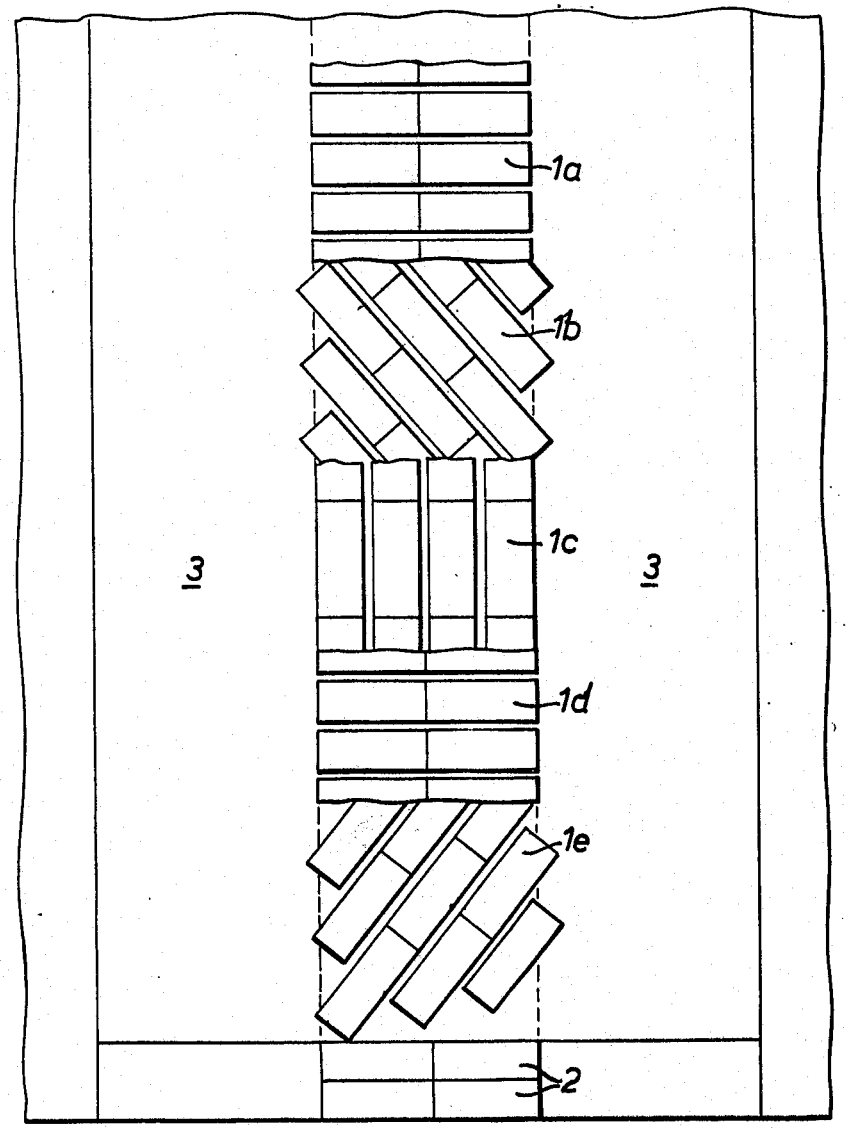
FIG. 4 shows a horizontal sectional scrap view taken on the line IV—IV of FIG. 1, in which different layers of green bricks are revealed.

The aforementioned spacing of bricks in the two bottom layers of the clamp provides a plurality of ducts extending through the walls separating adjacent tunnels. Thus, combustion gases can flow in said walls so that the lower layers of bricks become fully ignited, the burning process then extending upwardly from layer to layer of close-set green bricks until all the bricks have been fired. In a preferred modification, all the bricks constituting the walls between tunnels are open-spaced, that is for example throughout the lower five layers of bricks to the top of the tunnel openings. FIG. 4 shows a preferred setting of green bricks in a wall separating two adjacent tunnels 3. In the first, bottom-most, layer the bricks 1a are set as headers. In the second layer the bricks 1b are skintled and in the third layer the bricks 1c are set as stretchers. Bricks 1d of the fourth layer are again set as headers and in the fifth layer the bricks 1e are skintled but in the opposite direction to bricks 1b. As indicated the bricks are spaced to form ducts running in different directions between the two tunnels 3 and, in the case of the bricks 1c the ducts extend along the length of the wall. Communication between ducts is obtained where the ducts of one layer intersect those of an adjacent layer.

In a clamp of typical length there might be, say, thirty tunnels 3. Preferably, firing takes place successively at groups of adjacent tunnels, for example groups of five tunnels. In this case ten burners 8 may be employed located one at each end of the first five tunnels in the clamp. Alternatively, only one burner is applied to each tunnel in which case burners are located at opposite tunnel ends at successive tunnels. That is to say, in respect of the first, third and fifth tunnels the burners are located on one side of the clamp and in respect of the second, fourth and sixth tunnels the burners are located on the other side of the clamp, the free ends of the tunnels being closed off.

Preferably each burner 8 comprises, as shown in FIG. 3, a tubular body 9 terminating at one end in a flame nozzle 10 drawing air through an annular opening 11 and gas through a flexible pipe 12. A junction pipe 13 in the body 9 is connected to a source of compresed air through a flexible pipe 14. Assuming that five burners are located at each side of the clamp, the group of five burners on each side is supplied from a manifold 15. The manifold comprises supports such as 16 supporting a gas tube 17 and a compressed air tube 18. The tubes 17 and 18 extend horizontally alongside the clamp. The gas tube 17 includes five outlet nozzles 19 each having an on-off valve 20 and a quick-release coupling to which is coupled the pipe 12 of a gas burner. The air tube 18 comprises five nozzles 21 including an on-off valve 22 and a quick-release coupling to which is coupled the pipe 14 of a gas burner.

Each manifold 15 is supplied with gas through a flexible pipe 23 connected between one end of the gas tube 17 and a pipe 24 extending down and screwed to a support pillar 25 of a shed covering the clamp. Compressed air is supplied to one end of the air tube 18 from a portable air compressor unit (not shown). The fixed gas pipes 24, located down each side of the clamp shed, lead from supply pipes (not shown) in the roof of the clamp shed which supply gas from a remotely-located gas tank. For reasons which will be explained hereinafter, two manifolds 15 are provided at each side of the clamp, for use in conjunction with the group of five burners 8 at each side of the clamp.

With the burners in position at the ends of the first five tunnels and connected to the first manifold 15, the two burners at the first tunnel nearest the end of the clamp are ignited. The gas flames pass down the tunnel and also percolate through the ducts formed in the open-set bricks in the lower layers. The breeze and grits content of the adjacent green bricks ignites and eventually there is a mass of burning bricks and the combustion process is self-sustaining, without the aid of the gas burners, sufficiently to result in the firing of the majority of the bricks located in the region around and above the first tunnel. Preferably, the burners are initially operated with the compressed air supply turned off at stop-cock 22 and air drawn in through opening 11. When combustion has been established in the tunnel, for example after 4 to 8 hours, the compressed air is applied to boost the gas flames so that ignited gas is forced under pressure throughout all the tunnels being fired and the interconnecting ducts, this condition being maintained for, say, a further 7 to 12 hours after which the burners are extinguished and removed. The tunnel openings are then sealed with bricks and mortar and also the flue aperture 5 associated with that tunnel is closed, for example by covering with a heap of clay. In some applications, compressed air may be applied to the burners from the commencement of burning.

After the bricks around the first tunnel have begun to burn, for example after 4 to 6 hours from igniging the first burners, the burners of the second tunnel are ignited and so on in sequence along the group of five tunnels. When the burners at the first tunnel are removed their supply pipes 12 and 14 are uncoupled from the manifold 15 and the burners are moved down the clamp and positioned at the ends of the first tunnel in the next group (that is, the sixth tunnel from the clamp end) and the burner pipes are coupled to the appropriate outlets of the second manifold 15 associated with the tunnels of that group. The burners are then ignited in due course to fire the sixth tunnel. In a similar way the remaining burners are moved in succession to the second group of tunnels, after which the first manifold is moved to extend alongside the third group of tunnels. This procedure is repeated down the length of the clamp until all the tunnels have been fired.

When all the bricks have been burned and the clamp has cooled, the bricks are loaded into lorries and taken away. The invention facilitates this by enabling a lorry to be positioned close to the clamp face being dismantled without first having to clear the considerable rubbish constituted by the remains of a coke-bed.

Many of the details of the aforedescribed embodiment are capable of modification within the scope of the present invention, in particular the various dimensions given and the number of burners and manifolds employed. Referring to FIG. 3, in certain cases the provision of compressed air might be dispensed with so that the pipes 13 and 14 can be removed from the burner and the tube 18 and the air compressor from the manifold. Where compressed air is used, the two manifolds on a given side of the clamp can be linked between adjacent ends so that one compressor can feed the tubes 18 of both manifolds.

In another modification, the apertures 5 might be fitted with individual damper shutters which can be adjusted as required when the gas burners are operating and closed when the burners are removed.

Figure 5:
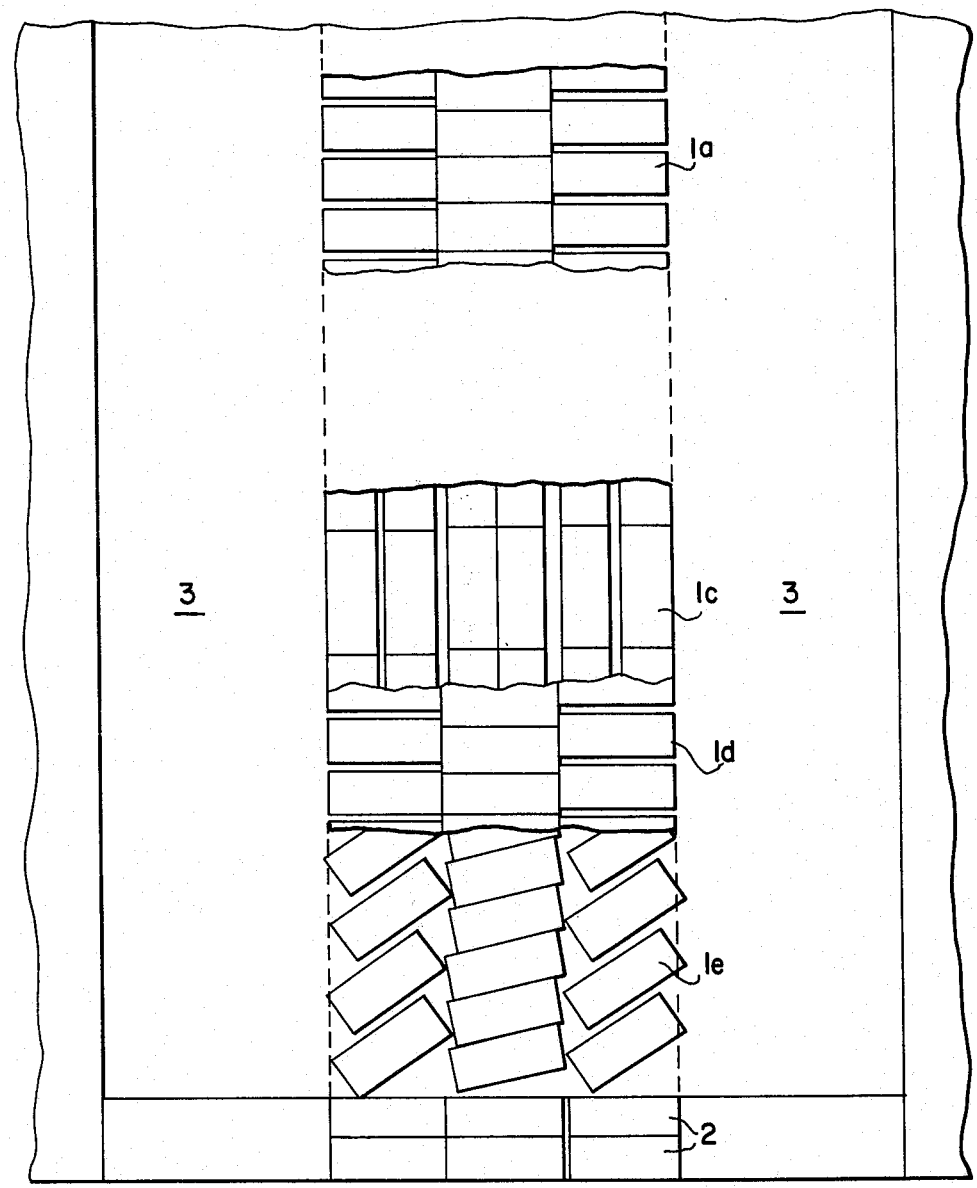
FIG. 5 shows a horizontal sectional view similar to FIG. 4, but shows an alternative arrangement of bricks in the different layers.

Instead of open-setting the lower layers of bricks throughout the area of the clamp, selected walls separating tunnels can include a row of close-set bricks in order to block the ducts extending between those tunnels so as to confine combustion gases to particular sections of the clamp. In the embodiment shown in FIG. 4 the layer 1a consists of two rows of header bricks but this can be modified, as shown in FIG. 5, so that the layer 1a includes an additional row of header bricks (three rows) with consequent increase in the number of bricks in the other layers of the wall between the two tunnels 3. Furthermore, the middle bricks in layer 1a and the overlying bricks in the other layers can be close-set to block the ducts formed in the outer rows of open-set bricks. If this construction of wall is adopted, for example, after every fourth tunnel down the clamp then the lower open-set layers of the clamp are divided into groups of four tunnels and the combustion gases will be contained within each group of tunnels during firing.

The invention permits a degree of control over the firing of a clamp of bricks which is not possible with the conventional coke-bed method. Also the cost of providing a coke-bed and of recovering the lower bricks from the coke-bed is avoided. More importantly, it has been found that a clamp of bricks can be burned in considerably less time than is taken by the conventional coke-bed method and at less expense even after allowing for the cost of the burner fuel. In one application of the invention, a clamp of approximately a quarter of a million bricks was burned in 2 weeks, the last gas burners being removed after 4 days. Burning such a clamp using the coke-bed method would have taken four weeks.

Instead of constructing the casing 2 entirely of individual casing bricks, the lower courses including the tunnel openings may be constituted by pre-cast blocks incorporating a number of tunnel-opening apertures. Such a block may be cast from a mixture of fondue cement and crushed firebrick. The dimensions could conveniently be 5 feet long, 20 inches high and 12 inches thick, the block including two suitably shaped tunnel openings. A series of such blocks is laid end to end down each side of the clamp, giving guidance also in the correct spacing of tunnels when stacking the green bricks. The casing above the blocks is continued by setting casing bricks on top of the blocks.

Preferably, firing tunnels are also provided in the end walls of the clamp, for example two such tunnels extending through the clamp and terminating in the fourth tunnel extending across the clamp. In this case, gas burners would be applied to such firing tunnels at the same time as gas burners are applied to the first tunnels extending across the clamp.

What we claim is:

1. A brick clamp for the firing of green bricks constructed wholly of bricks to be fired, said clamp consisting of a stack of green bricks arranged in layers with the bottom layer of bricks being in direct contact with a non-combustible supporting supporting surface and a casing structure of close-set casing bricks encasing the sides and top of the stack of green bricks, the lower layers of green bricks being stacked so as to form a plurality of tunnels having side walls and a top wall and a height less than the height of the stack, said tunnels running along the bottom of the stack and extending through the stack from one side to the other, and the upper layers of bricks being stacked to form flues communicating each tunnel with an aperture in the top of the clamp, the bricks in at least the two bottom layers of bricks forming the side walls of adjacent tunnels being open-set to provide a plurality of ducts extending between said adjacent tunnels and the remainder of the stacked green bricks being close-set, whereby the clamp of bricks can be completely fired by introducing a flow of ignited gas or vapor into each of said tunnels.

2. The brick clamp of claim 1, in which the bricks in all the layers of bricks forming the side walls of adjacent tunnels are open-set to provide the plurality of ducts extending between said tunnels.

3. The brick clamp of claim 1, in which some of the walls separating adjacent tunnels are constructed so that said ducts are blocked within the wall to thereby confine combustion gases to particular sections of the clamp formed between said blocked walls.

4. The method of firing green bricks in a clamp consisting entirely of bricks to be fired, comprising the steps of constructing a stack of green bricks on a noncombustible supporting surface and arranging them in layers one upon the other so as to form a plurality of tunnels running along the bottom of the stack of bricks and extending through the stack from one side to the other and to form a flue leading from each tunnel to a respective aperture in the top of the stack, open-setting the bricks in at least the bottom two layers forming the side walls of the tunnels so as to provide a plurality of ducts extending between adjacent tunnels and close-setting the bricks in the remaining layers of the stack, encasing said stack with a casing structure consisting of close-set casing bricks extending over the sides and top of the stack to provide the completed clamp, introducing successively at each tunnel an ignited source of a combustible gas or vapor, and after the green bricks forming the sides and top of the tunnels have ignited, removing said source of combustible gas and closing the tunnel and, if necessary, at least partially closing the aperture of the associated flue, whereby the process of combustion of the bricks spreads through the walls separating adjacent tunnels and upwardly to burn the entire clamp of green bricks.

* * * * *